US011670991B2

United States Patent
Shimada et al.

(10) Patent No.: US 11,670,991 B2
(45) Date of Patent: Jun. 6, 2023

(54) ELECTRIC DRIVING APPARATUS

(71) Applicant: Mitsubishi Electric Corporation, Tokyo (JP)

(72) Inventors: Saki Shimada, Tokyo (JP); Isao Sonoda, Tokyo (JP); Hideya Nishikawa, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 192 days.

(21) Appl. No.: 16/634,272

(22) PCT Filed: Aug. 23, 2017

(86) PCT No.: PCT/JP2017/030093
§ 371 (c)(1),
(2) Date: Jan. 27, 2020

(87) PCT Pub. No.: WO2019/038849
PCT Pub. Date: Feb. 28, 2019

(65) Prior Publication Data
US 2020/0177060 A1  Jun. 4, 2020

(51) Int. Cl.
*H02K 11/215* (2016.01)
*H02K 5/04* (2006.01)
*B62D 5/04* (2006.01)

(52) U.S. Cl.
CPC ............. *H02K 11/215* (2016.01); *H02K 5/04* (2013.01); *B62D 5/04* (2013.01)

(58) Field of Classification Search
CPC ...... H02K 11/215; H02K 5/04; H02K 11/225; B62D 5/04

(Continued)

(56) References Cited

U.S. PATENT DOCUMENTS 6,693,422 B2 * 2/2004 Lutz .......................... G01B 7/30
   310/68 B
7,642,681 B2 * 1/2010 Makiuchi ............... H02K 29/08
   310/67 R (Continued)

FOREIGN PATENT DOCUMENTS

EP    3 193 142 A2    7/2017
JP    S60-152251 A    8/1985

(Continued)

OTHER PUBLICATIONS

Office Action dated Jun. 2, 2020 in Japanese Application No. 2019-537476.

(Continued)

*Primary Examiner* — John K Kim
(74) *Attorney, Agent, or Firm* — Sughrue Mion, PLLC; Richard C. Turner (57) ABSTRACT

In an electric driving apparatus, a first rotational angle detecting sensor that generates a signal that corresponds to rotation of a shaft is disposed between a controlling apparatus and a motor. A housing accommodates the motor, the controlling apparatus, and the first rotational angle detecting sensor together. A second rotational angle detecting sensor that generates a signal that corresponds to rotation of the shaft is disposed at a position that is further away from the motor than the controlling apparatus in the axial direction of the shaft, and is disposed outside the housing. The first rotational angle detecting sensor is a magnetic detecting element sensor that includes: a magnet rotating body that includes a magnet, and that rotates together with the shaft; and a magnetic detecting element that detects magnetism from the magnet. The second rotational angle detecting sensor is a resolver.

5 Claims, 3 Drawing Sheets

(58) Field of Classification Search
USPC .................................................... 310/68 B
See application file for complete search history.

(56) References Cited

U.S. PATENT DOCUMENTS

| | | | |
|---|---|---|---|
| 2002/0053842 A1 | 5/2002 | Suzuki et al. | |
| 2007/0046122 A1* | 3/2007 | Makiuchi | H02K 29/08 310/156.05 |
| 2013/0141871 A1* | 6/2013 | Omae | H01L 24/34 361/709 |
| 2013/0300222 A1* | 11/2013 | Nakano | H02K 3/50 310/43 |
| 2014/0145564 A1* | 5/2014 | Taniguchi | H02K 5/1732 310/68 B |
| 2015/0022064 A1 | 1/2015 | Yamaguchi et al. | |
| 2015/0333600 A1* | 11/2015 | Nakano | H02K 11/33 310/68 B |
| 2016/0099623 A1* | 4/2016 | Böhm | H02K 9/19 310/43 |
| 2016/0111985 A1 | 4/2016 | Yoneda | |
| 2016/0190898 A1* | 6/2016 | Yamashita | H02K 11/225 310/68 B |
| 2018/0183294 A1* | 6/2018 | Nishikawa | F16J 15/14 |
| 2020/0177060 A1* | 6/2020 | Shimada | H02K 5/04 |

FOREIGN PATENT DOCUMENTS

| | | |
|---|---|---|
| JP | 2002-081961 A | 3/2002 |
| JP | 2003-319631 A | 11/2003 |
| JP | 2007-288959 A | 11/2007 |
| JP | 2014-030328 A | 2/2014 |
| WO | 2012/060123 A1 | 5/2012 |
| WO | 2012/160622 A1 | 11/2012 |

OTHER PUBLICATIONS

Extended European Search Report dated Jul. 6, 2020, issued by the European Patent Office in application No. 17922319.3.
International Search Report for PCT/JP2017/030093 dated Nov. 21, 2017 (PCT/ISA/210).
Communication dated Mar. 11, 2022 from the European Patent Office in European Application No. 17 922 319.3, 7 pages.

* cited by examiner

ELECTRIC DRIVING APPARATUS

CROSS REFERENCE TO RELATED APPLICATIONS

This application is a National Stage of International Application No. PCT/JP2017/030093 filed Aug. 23, 2017.

TECHNICAL FIELD

The present invention relates to an electric driving apparatus in which a controlling apparatus is disposed on a motor.

BACKGROUND ART

Conventionally, motors are known that separately detect rotational angle of a rotating shaft using a plurality of resolvers (see Patent Literature 1, for example). Motors are also known that separately detect rotational angle of a rotating shaft using a resolver and magnetic detecting elements (see Patent Literature 2, for example).

CITATION LIST

Patent Literature

[Patent Literature 1]
 Japanese Patent Laid-Open No. 2014-30328 (Gazette)
[Patent Literature 2]
 Japanese Patent Laid-Open No. 2002-81961 (Gazette)

SUMMARY OF THE INVENTION

Problem to be Solved by the Invention

If a plurality of sensors that include a resolver are disposed on an electric driving apparatus in which a controlling apparatus is disposed on a motor in order to improve reliability of the electric driving apparatus, the resolver must be disposed in a position that is close to the controlling apparatus. Because of that, detection errors may arise easily in the resolver due to electromagnetic noise that is generated by the controlling apparatus. Consequently, it is necessary to increase distance between the resolver and the controlling apparatus in order to suppress the occurrence of detection errors in the resolver. The electric driving apparatus is thereby enlarged.

The present invention aims to solve the above problems and an object of the present invention is to provide an electric driving apparatus that can improve reliability of detection of a rotational angle of a shaft, and that can also suppress increases in size.

Means for Solving the Problem

An electric driving apparatus according to the present invention includes: a shaft; a motor that rotates the shaft; a controlling apparatus that controls the motor, the controlling apparatus being disposed so as to be separated from the motor in an axial direction of the shaft; a first rotational angle detecting sensor that generates a signal that corresponds to rotation of the shaft, the first rotational angle detecting sensor being disposed between the controlling apparatus and the motor; a housing that accommodates the motor, the controlling apparatus, and the first rotational angle detecting sensor together; and a second rotational angle detecting sensor that generates a signal that corresponds to rotation of the shaft, the second rotational angle detecting sensor being disposed at a position that is further away from the motor than the controlling apparatus in the axial direction of the shaft, and being disposed outside the housing, wherein: the first rotational angle detecting sensor is a magnetic detecting element sensor that includes: a magnet rotating body that includes a magnet, and that rotates together with the shaft; and a magnetic detecting element that detects magnetism from the magnet; and the second rotational angle detecting sensor is a resolver.

Effects of the Invention

According to the electric driving apparatus according to the present invention, a plurality of rotational angle detecting sensors can be applied to the electric driving apparatus. Reliability of detection of the rotational angle of the shaft can thereby be improved. Furthermore, the resolver can be disposed closer to the controlling apparatus. Increases in the size of the electric driving apparatus can thereby be suppressed.

DESCRIPTION OF EMBODIMENTS

A preferred embodiment of the present invention will now be explained with reference to the drawings.

Embodiment 1

Figure 1:
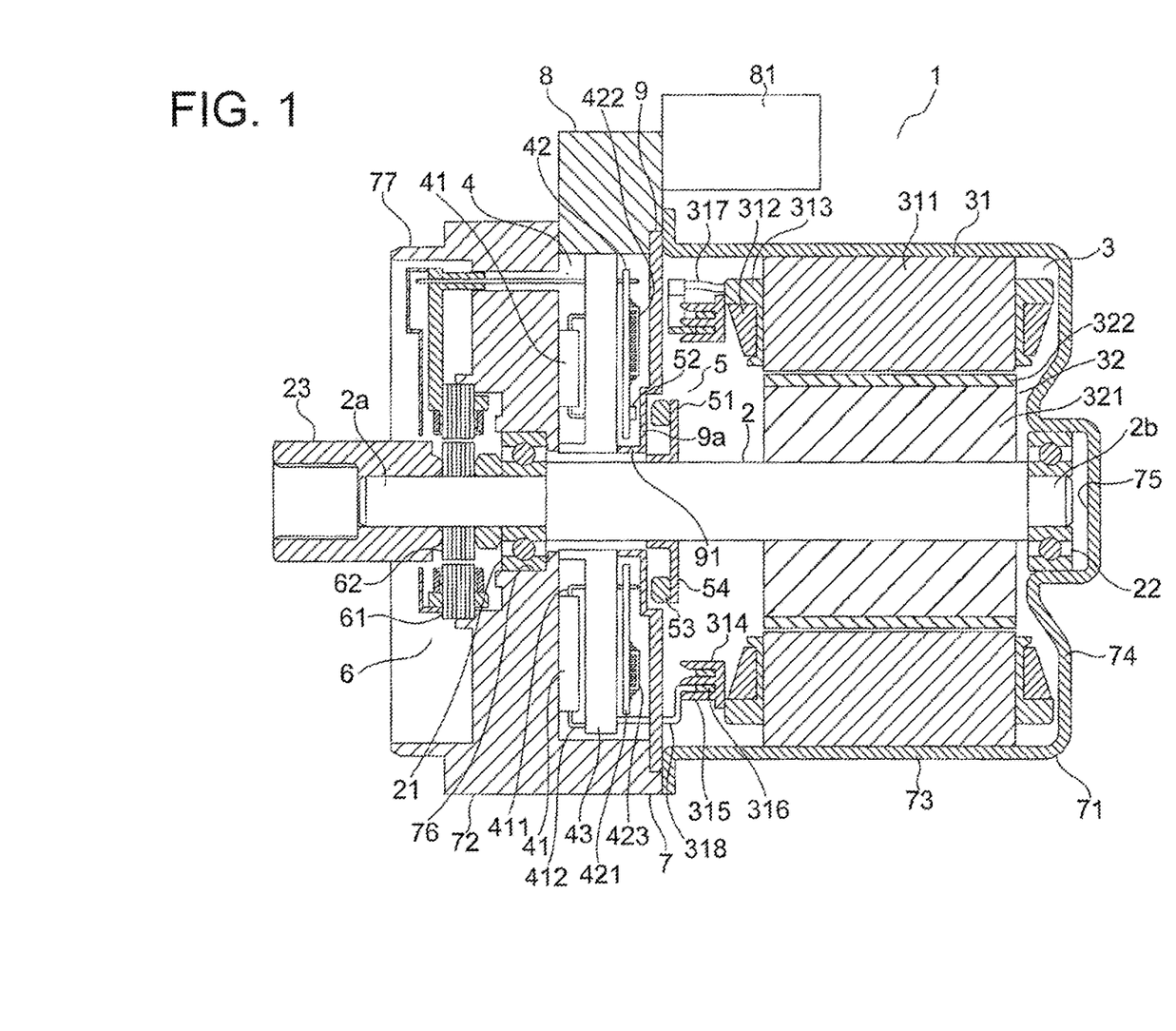
FIG. 1 is a cross section that shows an electric driving apparatus according to Embodiment 1 of the present invention.

FIG. 1 is a cross section that shows an electric driving apparatus according to Embodiment 1 of the present invention. In the figure, an electric driving apparatus 1 includes: a shaft 2; a motor 3 that rotates the shaft 2; a controlling apparatus 4 that controls the motor 3; a magnetic detecting element sensor 5 and a resolver 6 that each generate a signal that corresponds to the rotation of the shaft 2; and a housing 7 that accommodates the motor 3, the controlling apparatus 4, and the magnetic detecting element sensor 5 together. The electric driving apparatus 1 is used as a driving apparatus for a vehicle electric power steering apparatus, for example.

The housing 7 includes: a case 71; and a cover 72 that is fixed to the case 71. The cover 72 is a separate member from the case 71.

The motor 3 is accommodated inside the case 71. The case 71 includes: a tubular portion 73; and an end wall portion 74 that is disposed on an end portion of the tubular portion 73. An opening portion is disposed at a first end portion of the tubular portion 73. A second end portion of the tubular portion 73 is sealed by the end wall portion 74. An indented portion 75 is formed on a central portion of the end wall portion 74 as a rear-end bearing box portion.

The controlling apparatus 4 is accommodated in the cover 72. The cover 72 is fixed to the tubular portion 73. In addition, the cover 72 covers the opening portion of the tubular portion 73. A thickness of the cover 72 is greater than a thickness of the case 71. The cover 72 is constituted by a metal material that has thermal conductivity and electrical conductivity. In this example, a die-cast body that is constituted by an aluminum alloy that constitutes a nonmagnetic material is used as the cover 72. A passage aperture 76 is formed on a central portion of the cover 72 as a front-end bearing box portion. A protruding portion 77 for fitting the cover 72 together with a frame of a speed reducing mechanism (not shown) is disposed on an end portion of the cover 72 on an opposite side from the case 71.

The shaft 2 is passed through the passage aperture 76. The shaft 2 includes a first end portion 2a and a second end portion 2b. The first end portion 2a of the shaft 2 is positioned outside the housing 7 as an output portion of the shaft 2. The second end portion 2b of the shaft 2 is positioned inside the housing 7.

A front-end bearing 21 that functions as a first bearing that supports an intermediate portion of the shaft 2 is fitted into the passage aperture 76. A rear-end bearing 22 that functions as a second bearing that supports the second end portion 2b of the shaft 2 is fitted into the indented portion 75. The shaft 2 is rotatably supported in the housing 7 by means of the front-end bearing 21 and the rear-end bearing 22. A boss 23 that constitutes a coupling member for linking the shaft 2 to the speed reducing mechanism (not shown) is mounted to the first end portion 2a of the shaft 2.

The motor 3 includes: a tubular motor stator 31 that constitutes an armature; and a motor rotor 32 that is disposed inside the motor stator 31.

The motor stator 31 includes: a tubular stator core 311 that is fixed to an inner circumferential surface of the tubular portion 73; a plurality of stator coils 312 that are disposed on the stator core 311; and a resin insulator 313 that is interposed between the stator core 311 and the stator coils 312.

The stator core 311 is constituted by a magnetic material. In this example, a laminated body in which a plurality of electromagnetic steel sheets are laminated is used as the stator core 311. In this example, the stator core 311 is press-fitted into the tubular portion 73.

The plurality of stator coils 312 line up circumferentially around the stator core 311. Each of the plurality of stator coils 312 includes coil ends that protrude outward from two axial end portions of the stator core 311. Three-phase alternating current is made to flow through the plurality of stator coils 312 under control from the controlling apparatus 4. Rotating magnetic fields are generated in the motor stator 31 by supplying electric power to the plurality of stator coils 312.

An annular connecting member 314 that is disposed circumferentially around the stator core 311 is disposed on an end portion of the motor stator 31 near the cover 72. The connecting member 314 is thereby disposed between the motor stator 31 and the controlling apparatus 4. The connecting member 314 includes: a terminal holder 315 that constitutes an electrically insulating member that is mounted to the insulator 313; and a plurality of motor terminals 316 that constitute conductors that are disposed on the terminal holder 315. In this example, the terminal holder 315 is constituted by a resin, and each of the motor terminals 316 is constituted by copper.

A plurality of conducting wires 317 that protrude from each of the plurality of stator coils 312 are selectively connected to each of the motor terminals 316. The connected state of the plurality of stator coils 312 thereby becomes either wye-connected or delta-connected. Copper current-supplying terminals 318 that each emerge from the controlling apparatus 4 are individually connected to each of the motor terminals 316. Consequently, the connecting member 314 is an intermediary member that electrically connects the controlling apparatus 4 and the motor 3.

The motor rotor 32 is fixed to the shaft 2. The motor rotor 32 thereby rotates relative to the motor stator 31 together with the shaft 2. The motor rotor 32 includes: a cylindrical rotor core 321 that is fixed to the shaft 2; and a plurality of magnets 322 that are disposed on an outer circumferential portion of the rotor core 321.

The rotor core 321 is constituted by a magnetic material. In this example, a laminated body in which a plurality of electromagnetic steel sheets are laminated is used as the rotor core 321. A plurality of magnets 322 are lined up circumferentially around the motor rotor 32. Magnetic fields are formed on the motor rotor 32 by the plurality of magnets 322. The motor rotor 32 is rotated relative to the motor stator 31 together with the shaft 2 by the rotating magnetic fields arising in the motor stator 31. In other words, the motor 3 is a three-phase permanent-magnet synchronous motor.

Connectors 8 are disposed on a portion between the case 71 and the cover 72. The connectors 8 include: an electric power supply connector portion 81; and a signal connector portion (not shown). The electric power supply connector portion 81 and the signal connector portion are each exposed outside the housing 7. An electric power supply that supplies electric power to the controlling apparatus 4 is connected to the electric power supply connector portion 81. A battery or an alternator, for example, can be used as the electric power supply.

The controlling apparatus 4 is disposed so as to be separated from the motor 3 in an axial direction of the shaft 2. The controlling apparatus 4 is disposed at a position that is closer to the first end portion 2a of the shaft 2 than the motor 3. In addition, the controlling apparatus 4 includes: a plurality of power circuits 41 that drive the motor 3 by supplying electric power to the motor 3; a controlling circuit board 42 that controls each of the power circuits 41; a ripple capacitor (not shown) that absorbs ripples in the electric current that flows through the motor 3; a choking coil (not shown) that absorbs noise in the electric current at frequencies that are higher than a set frequency; and a lead frame 43 that is connected to the connectors 8.

The lead frame 43 includes: a resin molded body that constitutes an electrically insulating member; and a plurality of copper terminals that constitute conductors that are disposed in the resin molded body. In the lead frame 43, the plurality of copper terminals are integrated with the resin by insert-molding. A passage aperture that allows passage of the shaft 2 is disposed at a central portion of the lead frame 43. A tubular lug portion that protrudes in an axial direction toward the cover 72 from an inner circumferential surface of the passage aperture on the lead frame 43 is disposed on the lead frame 43. The cover 72 receives the protruding portion of the lead frame 43 in the axial direction of the shaft 2.

In the lead frame 43, electrical connection between the connectors 8 and each of the power circuits 41, electrical connection between the connectors 8 and the controlling circuit board 42, electrical connection among each of the power circuits 41, electrical connection between each of the power circuits 41 and the ripple capacitor, and electrical connection between each of the power circuits 41 and the choking coil is performed separately by the plurality of terminals.

Each of the power circuits 41 is disposed between the lead frame 43 and the cover 72. Furthermore, each of the power circuits 41 includes a plurality of switching elements that constitute heat-generating parts that control supply of electric power to the motor 3. Power metal oxide semiconductor field-effect transistors (MOSFETs), for example, are used as the switching elements. In addition, each of the power circuits 41 is mounted to the cover 72 in a closely-fitted state with an inner surface of the cover 72. Heat that is generated by each of the power circuits 41 thereby propagates through the cover 72 and is radiated externally. In other words, the cover 72 also functions as a heatsink that radiates the heat from each of the power circuits 41 externally.

Signal terminals 411 and output terminals 412 are disposed on each of the power circuits 41. The signal terminals 411 are electrically connected to the controlling circuit board 42 by means of the terminals of the lead frame 43. The output terminals 412 are electrically connected to the current supplying terminal 318 by means of the terminals of the lead frame 43. Commands that control the power circuits 41 are conveyed from the controlling circuit board 42 to each of the power circuits 41 individually by means of the signal terminals 411. Electric power that is controlled by the controlling circuit board 42 is conveyed from the power circuits 41 through the output terminals 412 to the motor 3.

The controlling circuit board 42 is disposed at a position that is closer to the motor 3 than the lead frame 43. The controlling circuit board 42 is supported by the lead frame 43. In addition, the controlling circuit board 42 includes: a circuit board 421 that is made of glass-reinforced epoxy resin; and a microcomputer 422 and a field-effect transistor (FET) driving circuit that are both mounted to the circuit board 421. The controlling circuit board 42 controls each of the power circuits 41 based on external information that is received from the signal connector portions of the connectors 8, and information from at least one of the magnetic detecting element sensor 5 and the resolver 6. Examples of external information include vehicle speed information that represents vehicle speed, for example. In this example, the control of each of the power circuits 41 by the controlling circuit board 42 is pulse-width modulation (PWM) control. In each of the power circuits 41, each of the switching elements performs switching operations in compliance with the control of the controlling circuit board 42. The supply of electric power to the motor 3 is controlled thereby.

A resin plate 9 that constitutes a partitioning wall that covers the opening portion of the case 71 is disposed between the motor 3 and the controlling apparatus 4. Entry of foreign matter into the case 71 from a side near the controlling apparatus 4 is thereby prevented. Space inside the housing 7 is partitioned off by the plate 9 into space inside the case 71 and space inside the cover 72. A passage aperture that allows passage of the shaft 2 is disposed at a central portion of the plate 9. A tubular lug portion 91 that protrudes toward the controlling apparatus 4 from an inner circumferential surface of the passage aperture on the plate 9 is disposed on the plate 9. The lead frame 43 receives the protruding portion 91 of the plate 9 in the axial direction of the shaft 2.

The magnetic detecting element sensor 5 is disposed between the motor 3 and the controlling apparatus 4 in the axial direction of the shaft 2 as a first rotational angle detecting sensor. The magnetic detecting element sensor 5 is disposed radially further inward than the connecting member 314. In addition, the magnetic detecting element sensor 5 includes: a magnet rotating body 51 that rotates together with the shaft 2; and a plurality of Hall elements 52 that constitute magnetic detecting elements that face the magnet rotating body 51 in the axial direction of the shaft 2.

The magnet rotating body 51 is disposed nearer to the motor 3 than the plate 9, and each of the Hall elements 52 is disposed nearer to the controlling apparatus 4 than the plate 9. An inner circumferential portion of the plate 9 is formed into a sensor position plate portion 9a that partitions a space between the magnet rotating body 51 and each of the Hall elements 52. A thickness of the sensor position plate portion 9a is thinner than a thickness of the plate 9 in portions other than the sensor position plate portion 9a. It thereby becomes possible to place the magnet rotating body 51 and each of the Hall elements 52 closer to each other in the axial direction of the shaft 2. An indented portion that forms a hollow toward the controlling apparatus 4 is formed on the plate 9 by the sensor position plate portion 9a. A portion of the magnet rotating body 51 is disposed inside the indented portion of the plate 9.

Figure 2:
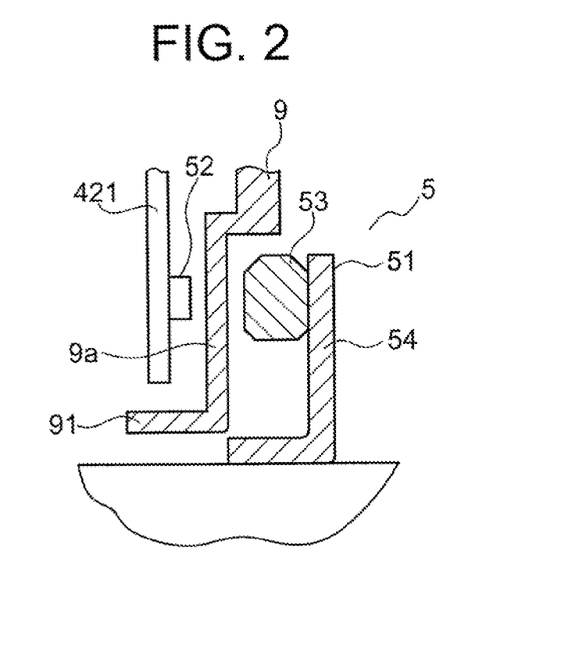
FIG. 2 is an enlarged cross section that shows a magnetic detecting element sensor from FIG. 1.
Figure 3:
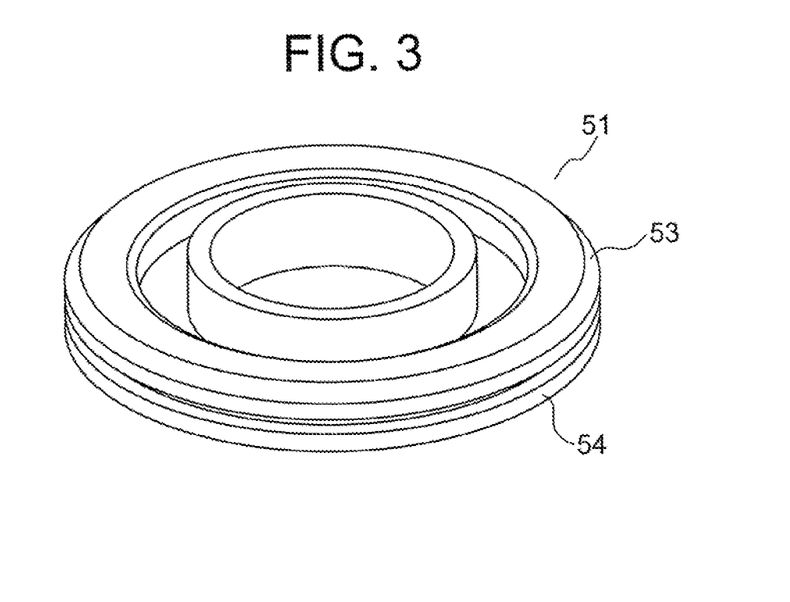
FIG. 3 is an oblique projection that shows a magnet rotating body from FIG. 2.

FIG. 2 is an enlarged cross section that shows the magnetic detecting element sensor 5 from FIG. 1. FIG. 3 is an oblique projection that shows the magnet rotating body 51 from FIG. 2. The magnet rotating body 51 includes: a ring-shaped magnet 53; and a magnet holder 54 that fixes the magnets 53 to the shaft 2.

The magnets 53 are disposed so as to surround a circumference of the shaft 2. The magnets 53 include a plurality of magnetic poles that line up in a circumferential direction of the magnets 53. In addition, the magnets 53 are magnetized in the axial direction of the shaft 2 so as to have an identical pole pair count to the motor rotor 32. The magnets 53 are fixed to the magnet holder 54 by an adhesive.

The magnet holder 54 is made of a magnetic material. In this example, the magnet holder 54 is produced by pressing metal sheets. The magnet holder 54 is fixed to the shaft 2 by being press-fitted onto the shaft 2. The magnets 53 and the magnet holder 54 thereby rotate together with the shaft 2 and the motor rotor 32. In addition to functioning to hold the magnets 53, the magnet holder 54 also functions as a back yoke that forms a magnetic path for magnetic flux from the magnets 53.

The Hall elements 52 face the magnets 53 in the axial direction of the shaft 2 so as to have the sensor position plate portion 9a interposed. Each of the Hall elements 52 detects magnetism from the magnets 53. The magnetism from the magnets 53 that is detected by each of the Hall elements 52 changes depending on the rotation of the magnet rotating body 51. Each of the Hall elements 52 generates a signal that corresponds to the detected magnetism. Each of the Hall elements 52 thereby generates a signal that corresponds to the rotation of the shaft 2. Each of the Hall elements 52 is disposed on the circuit board 421 of the controlling circuit board 42. In this example, three Hall elements 52 are disposed at regular intervals in the circumferential direction of the magnets 53. In this example, the magnetic detecting element sensor 5 thereby detects the rotational angle of the shaft 2 at a resolution of sixty electrical degrees of the motor 3.

As shown in FIG. 1, the resolver 6 is disposed at a position that is further away from the motor 3 than the controlling apparatus 4 in the axial direction of the shaft 2 as a second rotational angle detecting sensor. In other words, the resolver 6 is disposed at a position that is closer to the first end portion 2a of the shaft 2 than the controlling apparatus 4. The resolver 6 is thereby disposed on an opposite side of the controlling apparatus 4 from the motor 3 in an axial direction of the shaft 2. The resolver 6 is disposed outside the housing 7. The controlling apparatus 4 and the resolver

6 are thereby partitioned from each other by the cover 72. In this example, the resolver 6 is disposed between the boss 23 and the cover 72.

The resolver 6 includes: a tubular resolver stator 61; and a resolver rotor 62 that is disposed inside the resolver stator 61.

The resolver rotor 62 is fixed to the shaft 2. The resolver rotor 62 thereby rotates together with the shaft 2. The resolver rotor 62 is constituted by a magnetic material. In addition, a plurality of salient poles that line up in a circumferential direction of the resolver rotor 62 are disposed on an outer circumferential portion of the resolver rotor 62. The size of the gap between the resolver stator 61 and the resolver rotor 62 thereby changes depending on the rotation of the resolver rotor 62.

The resolver stator 61 is supported by the cover 72. The resolver stator 61 includes: a tubular resolver stator core; and an excitation coil and a plurality of detecting coils that are each disposed on the resolver stator core. An indented portion that forms a hollow toward the controlling apparatus 4 is disposed around a circumference of the passage aperture 76 on an external surface of the cover 72. Respective portions of the excitation coil and the respective detecting coils are disposed inside the indented portion of the cover 72. The plurality of detecting coils generate signals that correspond to the rotation of the resolver rotor 62 by the resolver rotor 62 rotating in a state in which the excitation coil is excited.

The signals from both the magnetic detecting element sensor 5 and the resolver 6 are sent to the controlling circuit board 42. Disposed on the controlling circuit board 42 are: an element sensor processing circuit that processes the signals from the magnetic detecting element sensor 5 to detect the rotational angle of the shaft 2; and a resolver processing circuit that processes the signals from the resolver 6 to detect the rotational angle of the shaft 2.

Now, the magnetic detecting element sensor 5 is accommodated inside the housing 7 together with the controlling apparatus 4 and the motor 3. The controlling apparatus 4 and the motor 3 are both noise-generating sources that generate electromagnetic noise. However, the Hall elements 52 of the magnetic detecting element sensor 5 have a characteristic of only detecting magnetic flux in a specific direction. Consequently, the magnetic detecting element sensor 5 is less likely to generate detection errors due to electromagnetic noise. Detecting precision of the magnetic detecting element sensor 5 is also lower than detecting precision of the resolver 6. Consequently, problems with electromagnetic noise are less likely to occur in the magnetic detecting element sensor 5 from the viewpoint of detecting precision as well.

The resolver 6, on the other hand, detects the rotational angle of the shaft 2 using weak magnetism that results from excitation of the excitation coils. Consequently, the resolver 6 is a rotational angle detecting sensor that is susceptible to electromagnetic noise. In comparison with that, a large electric current flows in each of the power circuits 41 of the controlling apparatus 4, and switching noise also arises due to the operation of the switching elements. Consequently, it is not desirable for the resolver 6, which is susceptible to electromagnetic noise, to be disposed close to the controlling apparatus 4.

In the present embodiment, however, the cover 72 is disposed between the controlling apparatus 4 and the resolver 6. The cover 72 exhibits a shielding effect that reduces effects of noise from the controlling apparatus 4 on the resolver 6. Detection errors thereby become less likely to occur in the resolver 6.

In other words, of the electromagnetic noise that is generated by the controlling apparatus 4, the noise that most easily affects the resolver 6 is noise that has high-frequency components such as switching noise, etc. Since the cover 72 is constituted by a material that has electrical conductivity, eddy currents arise in the cover 72 when the electromagnetic noise from the controlling apparatus 4 reaches the cover 72. Noise that has high-frequency components is easily suppressed by eddy current loss in the cover 72. The cover 72 thereby exhibits a shielding effect, making detection errors less likely to arise in the resolver 6.

Resolution and precision when detecting the rotational angle of the shaft 2 is higher in the resolver 6 than in the magnetic detecting element sensor 5. Consequently, during normal operation, the operation of the motor 3 is controlled by the controlling apparatus 4 based on the rotational angle information that is detected by the resolver 6.

However, if the resolver processing circuit that is disposed on the controlling circuit board 42 fails, or the resolver 6 itself fails, for example, and normal rotational angle detection by the resolver 6 becomes impossible, the controlling apparatus 4 switches to controlling operation of the motor 3 based on rotational angle information that is detected by the magnetic detecting element sensor 5. In other words, in the present embodiment, the magnetic detecting element sensor 5 is used as a backup rotational angle detecting sensor for the resolver 6. Improvements in the reliability of detection of the rotational angle of the shaft 2 in the electric driving apparatus 1 are thereby achieved.

In an electric driving apparatus 1 of this kind, because the motor 3, the controlling apparatus 4, and the magnetic detecting element sensor 5 are accommodated in the housing 7, and the resolver 6 is disposed outside the housing 7, and the magnetic detecting element sensor 5 is disposed between the motor 3 and the controlling apparatus 4, a plurality of rotational angle detecting sensors can be applied to the electric driving apparatus 1, enabling reliability of the detection of the rotational angle of the shaft 2 in the electric driving apparatus 1 to be improved. Furthermore, the resolver 6 can be shielded by the housing 7 from electromagnetic noise from both the motor 3 and the controlling apparatus 4, enabling the resolver 6 to be disposed closer to the controlling apparatus 4. In addition, the magnetic detecting element sensor 5 can be disposed in dead space between the motor 3 and the controlling apparatus 4. Increases in the size of the electric driving apparatus 1 can thereby be suppressed. Furthermore, a dedicated part that shields the resolver 6 from electromagnetic noise is no longer necessary, enabling cost reductions also to be achieved.

Because the opening portion of the case 71 is sealed by the plate 9 that is disposed between the motor 3 and the controlling apparatus 4, foreign matter can be prevented from entering the case 71 by the plate 9, further enabling improvements in the reliability of the electric driving apparatus 1.

Because the Hall elements 52 are each mounted to the controlling apparatus 4, a dedicated circuit board that controls each of the Hall elements 52, and members that perform wiring of each of the Hall elements 52, no longer need to be disposed separately. Reductions in installation space for the magnetic detecting element sensor 5 and cost reductions can thereby be achieved.

Because the connecting member 314 that is electrically connected to both the motor 3 and the controlling apparatus 4 is disposed on the motor 3, and the magnetic detecting element sensor 5 is disposed radially further inward than the connecting member 314, the magnetic detecting element sensor 5 can be made less likely to interfere with the connecting member 314 in the axial direction of the shaft 2. Increases in the size of the electric driving apparatus 1 in an axial direction of the shaft 2 can thereby be suppressed while still achieving improvements in the reliability of the electric driving apparatus 1.

Because at least a portion of the magnetic detecting element sensor 5 is disposed within a zone that overlaps with the connecting member 314 in the axial direction of the shaft 2, increases in the size of the electric driving apparatus 1 in an axial direction of the shaft 2 can be further suppressed.

Moreover, in the above example, the number of Hall elements 52 in the magnetic detecting element sensor 5 is three, but is not limited thereto, and the number of Hall elements 52 in the magnetic detecting element sensor 5 may alternatively be one, two, or four or more, for example.

In the above example, the plate 9, which constitutes a partitioning wall, is disposed between each of the Hall elements 52 and the magnets 53, but the plate 9 may alternatively be disposed so as to avoid being between each of the Hall elements 52 and the magnets 53. For example, by disposing the sensor position plate portion 9a of the plate 9 nearer to the motor 3 than the magnet rotating body 51, it is possible not to dispose the plate 9 between each of the Hall elements 52 and the magnets 53. In this manner, the distance between each of the Hall elements 52 and the magnets 53 can be further reduced, enabling the detecting precision of the magnetic detecting element sensor 5 to be improved.

In the above example, Hall elements 52 are used as the magnetic detecting elements, but the magnetic detecting elements are not limited thereto, and magnetoresistive elements, for example, may alternatively be used as the magnetic detecting elements. Examples of magnetoresistive elements include: anisotropic magnetoresistive (AMR) elements, giant magnetoresistive (GMR) elements, tunnel magnetoresistive (TMR) elements, etc.

Figure 4:
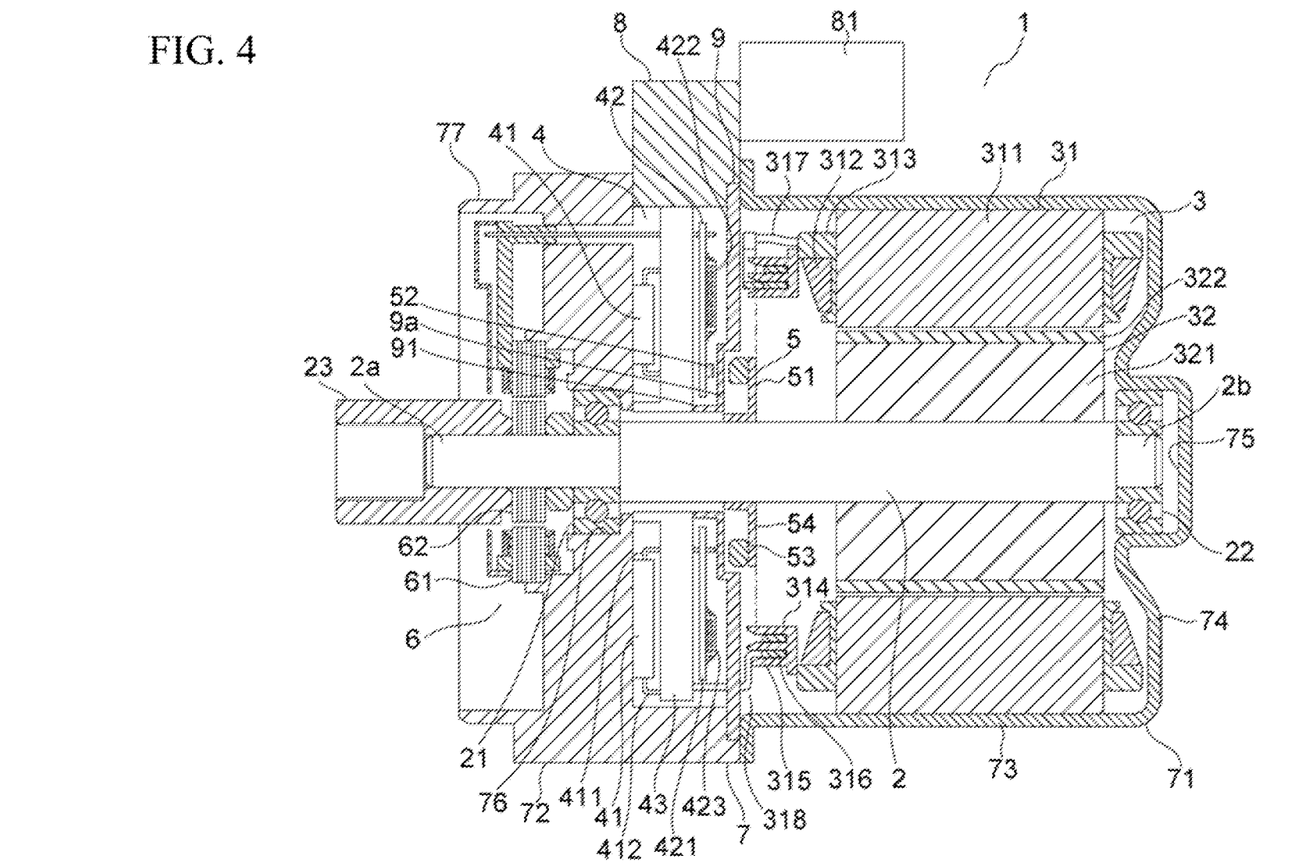
FIG. 4 is a cross section that shows an electric driving apparatus according to an embodiment.

In the above example, at least a portion of the magnetic detecting element sensor 5 may alternatively be disposed in a zone that overlaps with the connecting member 314 in the axial direction of the shaft 2 (FIG. 4). For example, a portion of the magnet rotating body 51 may be disposed in a zone that overlaps with the connecting member 314 in the axial direction of the shaft 2. By doing so, reductions in the dimensions of the electric driving apparatus 1 in the axial direction of the shaft 2 can be further achieved.

In the above example, the motor 3 is a three-phase permanent-magnet synchronous motor, but is not limited thereto, and the motor 3 may alternatively be an induction motor, for example.

In the above example, a single set of three phase windings is used in the motor 3, but is not limited thereto, and a plurality of sets of three phase windings may alternatively be used in the motor 3, and a plurality of sets of power circuits 41 that corresponds to each set of three phase windings may be used in the controlling apparatus 4.

EXPLANATION OF NUMBERING

1 ELECTRIC DRIVING APPARATUS; 2 SHAFT; 3 MOTOR; 4 CONTROLLING APPARATUS; 5 MAGNETIC DETECTING ELEMENT SENSOR (FIRST ROTATIONAL ANGLE DETECTING SENSOR); 6 RESOLVER (SECOND ROTATIONAL ANGLE DETECTING SENSOR); 7 HOUSING; 9 PLATE (PARTITIONING WALL); 51 MAGNET ROTATING BODY; 52 HALL ELEMENT (MAGNETIC DETECTING ELEMENT); 53 MAGNET; 71 CASE; 72 COVER; 314 CONNECTING MEMBER.

The invention claimed is:

1. An electric driving apparatus comprising:
   a shaft;
   a motor that rotates the shaft;
   a controlling apparatus that controls the motor, the controlling apparatus being disposed so as to be separated from the motor in an axial direction of the shaft;
   a first rotational angle detecting sensor that generates a signal that corresponds to rotation of the shaft, the first rotational angle detecting sensor being disposed between the controlling apparatus and the motor;
   a housing that accommodates the motor, the controlling apparatus, and the first rotational angle detecting sensor together; and
   a resolver that generates a signal that corresponds to rotation of the shaft, the resolver being disposed at a position that is further away from the motor than the controlling apparatus in the axial direction of the shaft, and being disposed outside the housing,
   wherein:
      the first rotational angle detecting sensor is a magnetic detecting element sensor that comprises:
         a magnet rotating body that includes a magnet, and that rotates together with the shaft; and
         a magnetic detecting element that detects magnetism from the magnet;
   wherein:
      the housing comprises:
         a case on which an opening portion is disposed; and
         a cover that covers the opening portion;
      the motor is accommodated inside the case;
      the controlling apparatus is accommodated inside the cover; and
      the opening portion is closed by a partitioning wall that is disposed between the motor and the controlling apparatus,
   an inner circumferential portion of the partitioning wall is formed into a sensor position plate portion that partitions a space between the magnet rotating body and the magnetic detecting element, and
   a thickness of the sensor position plate portion is thinner than a thickness of the partitioning wall in portions other than the sensor position plate portion, wherein:
      the magnet rotating body further includes a magnet holder to which the magnet is fixed on a side facing the inner circumferential portion of the partitioning wall,
      the inner circumferential portion is formed in an L-shape, and
      the magnet holder is formed in an L-shape which follows the L-shape of the inner circumferential portion.

2. The electric driving apparatus according to claim 1, wherein the magnetic detecting element is mounted to the controlling apparatus.

3. The electric driving apparatus according to claim 1, wherein:
   a connecting member that is electrically connected to both the motor and the controlling apparatus is disposed on the motor;
   the connecting member is disposed between the motor and the controlling apparatus; and
   the first rotational angle detecting sensor is disposed radially further inward than the connecting member.

4. The electric driving apparatus according to claim 2, wherein:

a connecting member that is electrically connected to both the motor and the controlling apparatus is disposed on the motor;
the connecting member is disposed between the motor and the controlling apparatus; and
the first rotational angle detecting sensor is disposed radially further inward than the connecting member.

5. The electric driving apparatus according to claim 4, wherein at least a portion of the first rotational angle detecting sensor is disposed in a zone that overlaps with the connecting member in the axial direction of the shaft.

\* \* \* \* \*